Dec. 9, 1930.  H. LUDWIG  1,784,191
SHOCK ABSORBER
Filed July 8, 1926  2 Sheets-Sheet 1
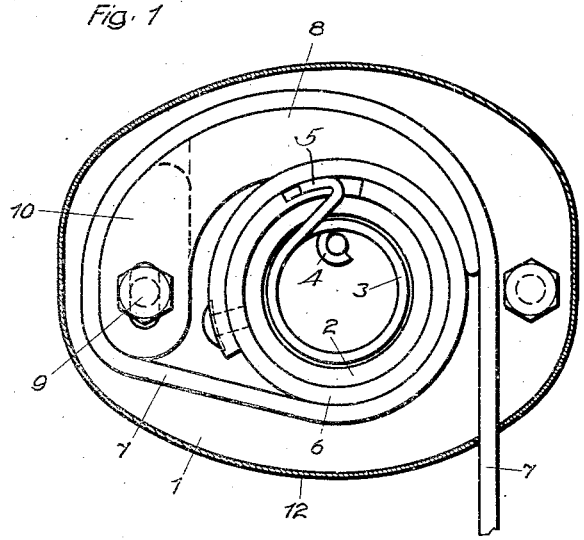
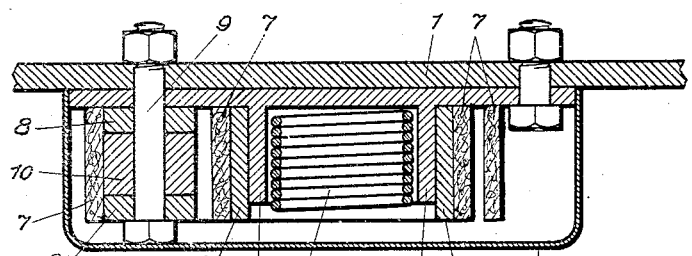
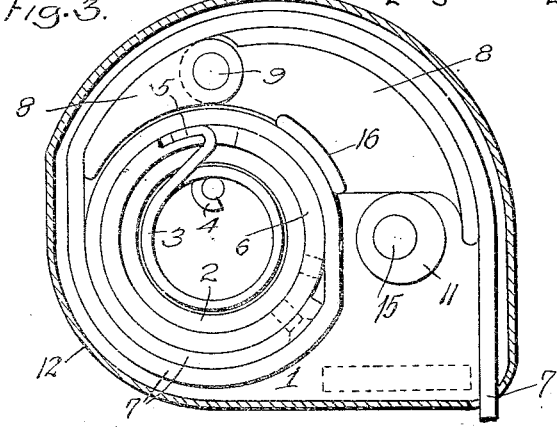
H. Ludwig
inventor
By Marks & Clerk
Attys Dec. 9, 1930.          H. LUDWIG          1,784,191
SHOCK ABSORBER
Filed July 8, 1926          2 Sheets-Sheet 2
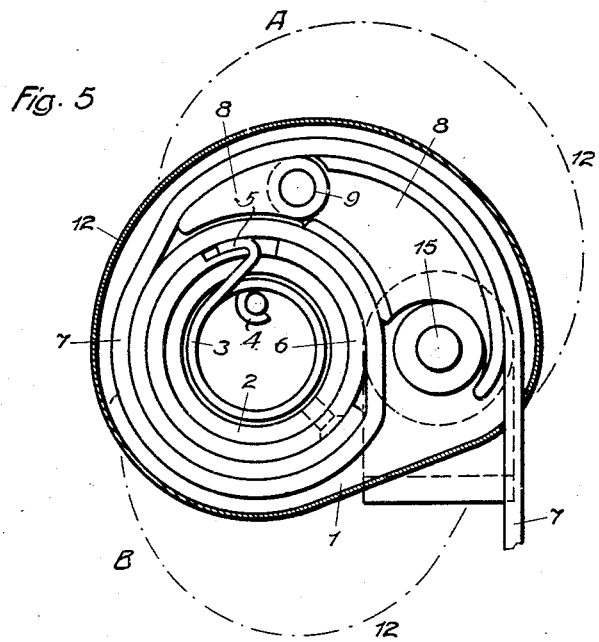
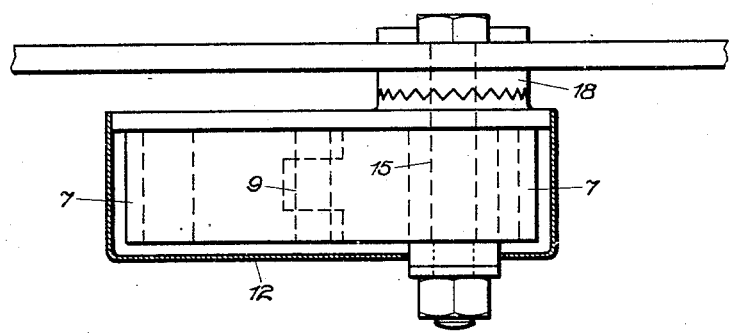
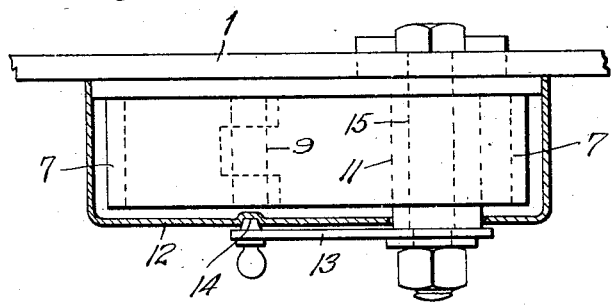
H. Ludwig, inventor Patented Dec. 9, 1930

1,784,191

UNITED STATES PATENT OFFICE

HANS LUDWIG, OF HOMBURG-ON-THE-HOHE, GERMANY

SHOCK ABSORBER

Application filed July 8, 1926, Serial No. 121,194, and in Germany October 1, 1925.

The present invention relates to a shock absorber for automobile vehicles and for the trailers, side cars and the like that are frequently used with them. In the case of the present invention the carriage spring, in a known manner, reacts freely to the shock producing stressing of the spring and undergoes the damping during the recoil or relaxation of the spring. In the case of the shock absorbers hitherto known and based on this principle however, the scope of the damping is restricted and is determined according to the size of certain parts. Consequently for each class or power of vehicles a shock absorber of definite size is required, as a result of which the manufacture thereof is unfavourably influenced.

The shock absorber according to the present invention, on the contrary, is of small compass, and can be adapted by adjustment to the proportions coming into consideration for the shock absorbing of the most varied kinds of power driven vehicles. This adjustment is of course possible in various ways, and various methods are dealt with in the present application.

The accompanying drawings illustrate three constructional forms of the invention.

Figures 1 and 2, show the first constructional form, in front elevation and in longitudinal section, respectively, the casing cover being in section.

Figures 3 and 4, show the second constructional form, in front elevation and plan, respectively, the casing cover being correspondingly in section.

Figures 5 and 6, on Sheet 2, show the third constructional form, in front elevation and in plan, the casing cover being in section in both cases.

Upon a bed plate 1 (Figures 1 and 2) arranged on the car body, is secured a sleeve 2, in which a coil spring 3 is lodged. The latter engages with one end 4 in the plate 1 and with the other end 5 in a drum 6, which is rotatable over the sleeve 2. Around the drum 6 is coiled a brake band 7, which has one end secured to the drum and which then passes over a brake block 8, and is finally attached to a part of the carriage underframe, for instance, to the axle. The brake block 8 is adjustable on a bolt 9, so that it can be caused to bear with a larger or smaller surface upon the inner turn of the brake band 7, while its external surface is covered by the outer turn of the brake band 7. In order to enable the covered surface to be regulated here also, an egg-shaped member 10, which is mounted in a slot in the brake block 8, is vertically adjustable (see Figure 1) on the bolt 9, so that the brake band 7 can be partly lifted off the brake block 8.

The shock absorber operates in such a manner that in the event of a shock to the vehicle, resulting from a bad road, owing to stones or the like, the carriage spring affected is stressed, that is to say, the underframe and the car body approach one another. Under these circumstances a sudden loosening of the brake band 7 occurs, and the latter is immediately stressed by the spring 3. During the succeeding recoil or relaxation of the spring, the brake band 7 is pulled tight over the brake block 8, and the latter presses moreover upon the inner turn of the brake band 7, so that a great deal of friction is produced on both sides. This leads to the desired slower return movement of the car body from the underframe (the shock absorption), the resilient oscillations of the carriage spring, which need a certain amount of time for dying away, being hindered. By adjusting the brake block 8 or the part 10 on the bolt 9 the observed action of the shock absorber can be regulated as required.

In the case of the first constructional form, already described, of the shock absorber, the adjustability is rough. In order to make it finer, and thereby attain a greater graduation, a second constructional form, shown in Figures 3 and 4, may be used. In the case of the latter the arrangement as regards the coil spring with casing and drum, and the brake band, is the same as in the first constructional form. The novelty resides in the fact that the brake block is constructed as a two-armed lever 8, which bears with its longer arm upon an eccentric 11. The latter is adjustable from outside, without the necessity for opening the casing, by means of an indicator lever 13, which admits of being fixed in position by means of a tooth or projection 14, in suitably arranged notches in the casing cover 12. This may also be accomplished in another way by the screwing of an eccentric shaft 15. The lever brake block 8 bears only with part of its under side upon the inner turn of the brake band 7, as according to experience this area is sufficient for exerting even the greatest braking pressure. A regulation or diminution thereof is effected by adjusting the eccentric 11, whereby the requisite fine adjustment of the pressure of the surface 16 can be effected. In order to enable the rotary spring 3 to be reset, as its resilience diminishes after releasing the brake band 7, the fastening bolts 17 thereof are inserted in another hole in the casing 2, located further back, and the brake band pulled into the normal position.

Instead of being two-armed the lever 8 may be made one-armed, with the longer arm only, and the shorter arm is then cast on or otherwise secured to the base plate 1. This arrangement has the advantage that the bolt 9 is relieved of the pressure of the outer turn of the brake band 7.

In order to attain a still greater scope for the shock absorber, and to make the adjustment thereof particularly simple, a constructional form may be selected as shown in Figures 5 and 6. Here again the rotary spring, with casing, sleeve and brake band, is arranged in the same way as in the two previous constructional forms. The novel feature of this arrangement resides in the fact that the lever 8 either bears upon a bolt 15, which however is not eccentric, or else rests freely, without any such bearing, upon the inner turn of the brake band. In the former case the brake band 7 is not loaded, but in the second case there is a pressure thereon. Furthermore, the shock absorber as a whole is rotatable about the securing bolt 15, by which it is fitted to the car body. In order to enable it under these circumstances to be fastened reliably, in different positions (see Figure 1) a toothed clutch 18 is fitted between the casing 1 and the point of attachment.

When the shock absorber is to be adapted to the characteristics of the vehicle equipped therewith, it is first secured in the position estimated to be preferable, and the latter tested by experiment. If there then appears to be any necessity to moderate the action of the shock absorber, the same is brought into the position marked A in Figure 5. Here the brake band 7 only bears upon a part of the surface of the lever 8, and the pressure or braking action is smaller, in correspondence with the bearing area. If, on the contrary, the damping has to be strengthened, the casing must be rotated into the position marked B. The lever 8 is now covered over a larger area by the brake band 7 and the pressure action under these circumstances undergoes a corresponding increase. The adjustment in general, by the aid of the notch coupling 18, is simple, and does not necessitate a delicate sense of touch.

If the lever 8 bears upon the bolt 15, or if it is constructed virtually as a fixed constituent of the casing 1, the braking effect is only about half as great as when, for the same position of the parts, the lever 8 bears upon the inner turn of the brake band 7. From this there again result various possibilities of application. It is an advantage to enable the position of the lever 8 to be ascertained from outside, in order to enable the conjectural action of the brake band 7 to be judged when the shock absorber is adjusted. For this purpose the outlines of the lever 8 for example are indicated on the cover of the casing 1, by embossing for instance. Instead of this a scale may be employed in the usual way.

What I claim is:

1. A shock absorber for vehicles, comprising in combination, a base member intended to be secured to the frame of the vehicle, a winding drum rotatably mounted on said base member, a rigid brake block pivoted on said base member so as to be capable of displacement towards and away from said winding drum, a brake band having one end intended to be connected to the vehicle underframe and the other end connected to the said winding drum so as to be capable of being wound on the drum, said brake band being passed round the brake block so as to enable it to force the brake block towards the winding drum and bear on a portion of the brake band wound on the drum, on the brake band being subjected to tension, and a spring connected to said winding drum for rotating the drum for winding up the brake band, on the frame of the vehicle approaching the vehicle underframe, as and for the purposes set forth.

2. A shock absorber for vehicles, comprising in combination, a base member intended to be secured to the frame of the vehicle, a sleeve fixed to said base member, a winding drum rotatably mounted on said sleeve, a rigid brake block pivoted on said base member so as to be capable of displacement towards and away from said winding drum, a brake band having one end intended to be connected to the vehicle underframe and the other end connected to the said winding drum so as to be capable of being wound on the drum, said brake band being passed round the brake block so as to enable it to force the brake block towards the winding drum and bear on a portion of the brake band wound on the drum, on the brake band being subjected to tension, and a spring connected to said winding drum for rotating the drum for winding up the brake band, on the frame of the vehicle approaching the vehicle underframe, as and for the purposes set forth.

3. A shock absorber for vehicles, comprising in combination, a base member intended to be secured to the frame of the vehicle, a sleeve fixed to said base member, a winding drum rotatably mounted on said sleeve, a rigid brake block pivoted on said base member so as to be capable of displacement towards and away from said winding drum, a brake band having one end intended to be connected to the vehicle underframe and the other end connected to the said winding drum so as to be capable of being wound on the drum, said brake band being passed round the brake block so as to enable it to force the brake block towards the winding drum and bear on the portion of the brake band wound on the drum, on the brake band being subjected to tension, and a coil spring housed within said sleeve and connected to said winding drum for rotating the drum for winding up the brake band on the frame of the vehicle approaching the vehicle underframe, as and for the purposes set forth.

4. A shock absorber as set forth in claim 1, and having a bolt contacting with said brake block for securing the base member to the vehicle frame and locking means on the vehicle frame and base member for fixing the said base member in different angular positions about said bolt to vary the arc of contact of the brake band upon said brake block, as and for the purposes set forth.

5. A shock absorber as set forth in claim 1, said brake block being pivoted intermediately of its ends, a bolt for securing the base member to the vehicle frame and teeth on the vehicle frame and base member, said teeth being capable of engaging one another for fixing the said base member in different angular positions about said bolt, for the purpose set forth.

In testimony whereof I have signed my name to this specification.

HANS LUDWIG.